United States Patent [19]

Zupanick

[11] Patent Number: 4,645,144

[45] Date of Patent: Feb. 24, 1987

[54] METHOD AND APPARATUS FOR EFFECTING FINE CONTROL OF AIRCRAFT VELOCITY

[75] Inventor: Joseph E. Zupanick, Richardson, Tex.

[73] Assignee: Atlantic Richfield Company, Los Angeles, Calif.

[21] Appl. No.: 808,544

[22] Filed: Dec. 13, 1985

Related U.S. Application Data

[62] Division of Ser. No. 651,022, Sep. 17, 1984.

[51] Int. Cl.[4] ............................................... B64C 9/32
[52] U.S. Cl. ................................. 244/113; 244/1 TD; 244/110 D; 244/191; 244/76 R
[58] Field of Search ............... 244/1 TD, 110 D, 113, 244/75 R, 76 R, 182, 191

[56] References Cited

U.S. PATENT DOCUMENTS

| | | | |
|---|---|---|---|
| 2,761,636 | 9/1956 | Finlay | 244/113 |
| 2,948,496 | 8/1960 | Joline | 244/77 |
| 3,212,730 | 10/1965 | Tschudy et al. | 244/138 R |
| 3,390,853 | 7/1968 | Wykes | 244/113 |
| 3,448,948 | 6/1969 | Reerink | 244/77 |

Primary Examiner—Sherman D. Basinger
Assistant Examiner—Rodney Corl
Attorney, Agent, or Firm—James H. Phillips

[57] ABSTRACT

In order to achieve fine control of the velocity of an aircraft flying a predetermined flight path at a predetermined nominal speed in the presence of such perturbations as wind gusts, a low inertia, fast acting device is extended or deployed into the aircraft dragstream and is rapidly position-modulated in response to sensed acceleration/deceleration to instanteneously slightly alter the total system drag to an amount which causes the aircraft to maintain the predetermined velocity. Among the exemplary alternative low inertia devices disclosed are: fuselage and wing mounted flaps which are rapidly more or less extended, a trailing cable which is rapidly reeled in or out, and a trailing inflatable member whose degree of inflation is rapidly changed, all in response to sensed acceleration/deceleration from an on-board system.

9 Claims, 8 Drawing Figures 4,645,144

METHOD AND APPARATUS FOR EFFECTING FINE CONTROL OF AIRCRAFT VELOCITY

This is a division of application Ser. No. 651022, filed Sept. 17, 1984.

FIELD OF THE INVENTION

This invention relates to the aircraft velocity control arts and, more particularly, to a method and apparatus for effecting fine control of the velocity of an aircraft while conducting earth surveys or the like.

BACKGROUND OF THE INVENTION

Numerous instruments are employed in an airborne mode to carry out a wide variety of earth survey activities. Often, such surveys are conducted from relatively slow flying aircraft. By way of example, a camera may be mounted in a survey aircraft such that it is stabilized for roll, pitch and yaw whereby there is no relative motion between the camera and the ground except for velocity. If the film is advanced at the speed of the aircraft, a very good continuous photograph of the scene below may be obtained; however, there is no provision for sensing and compensating for transient dv/dt which may be brought about by wind gusts or other perturbations, and, as a result, the actual photograph may be randomly distorted longitudinally.

As another and related example, an airborne survey conducted to secure geological information is fairly typically carried out from an aircraft flying a carefully defined grid pattern at as constant a ground velocity as may be reasonably possible and which often may not be much in excess of 100 miles per hour. The fundamental reason for flying such closely controlled paths is to preserve the ability to later find, on the ground, any sort of geological anomoly which may be of investigative interest. Aircraft systems employed for such purposes as exploration for oil, gas, and other minerals usually carry sophisticated inertial navigation equipment which may be augmented by beacons temporarily placed at precisely known points within the area of operation. As information from whatever sensing instruments are in use is recorded (typically on a high density tape machine), navigational information is also recorded to provide a record of the aircraft's instantaneous position through the mission.

As is well known in the art, one aspect of preparing overlays to standard maps in order to relate any sensed anomoly to a precise ground position on the map is the extent to which brief perturbations of the aircraft ground velocity, such as may be caused by wind gusts, distort the aircraft's apparent instantaneous position with respect to its actual instantaneous position. If the apparent instantaneous aircraft position is recorded often enough, along with instantaneous acceleration/deceleration information, such distortions can be computer processed for substantial elimination. However, it is apparent that the computer processing power and time required can be significantly reduced if the aircraft's ground velocity could be closely maintained to the setpoint; i.e., to the nominal ground velocity predetermined for use during an operative pass. Additionally, it may be generally stated that the smaller the navigational error which must be corrected by computer processing, the smaller the residual error remaining after such processing will usually be.

Apparatus is often included in such survey aircraft to provide either or both of repetitive still photographs and video recordings of the ground scene below to provide further information to aid in subsequently finding and investigating discovered anomolies. As noted above, the more closely the picture taking mechanism (which is often actuated in fixed time increments) can be synchronized to the actual aircraft ground velocity, the more accurate will be the actual position depicted in the views recorded. For this reason also, the achievement of close control of the survey aircraft ground velocity is highly beneficial.

A survey aircraft can be guided along its predetermined flight path manually or under the control of an autopilot. In the prior art, to assist in holding the ground velocity steady, the autopilot may include an accelerometer, or the aircraft may have an independent accelerometer or the pilot may simply react to sensed or observed acceleration/deceleration. The output signal from either source of instantaneous aircraft acceleration/deceleration information is typically employed to automatically adjust engine speed to compensate for wind gusts and like perturbations to the aircraft ground velocity, or the pilot can adjust the engine speed manually; however, those skilled in the art are very aware that the compensation achieved by controlling engine speed is unsatisfactorily slow to react because of the high inertia of the engine and, indeed of the entire "system". That is, if acceleration caused by a gust from the rear is to be counteracted by momentarily slowing the engine, not only must the engine inertia be overcome, but also the aircraft forward inertia. Conversely, if deceleration caused by a gust from the front is to be counteracted by momentarily increasing engine speed, both the engine and aircraft inertia must be overcome. If the aircraft is under manual control, the pilot "inertia" is a manifest further source of inaccurate and too slow response.

There are similar conditions in which air velocity, rather than ground velocity, must be maintained as steady as possible. For example, during interaction between two aircraft, such as encountered in airborne refueling, it is very desirable to hold the two aircraft as close as possible to the predetermined optimum spacing and relative positioning.

It will therefore be readily appreciated by those skilled in the art that it would be highly desireable to provide an automatic, low inertia means for closely regulating the ground or air velocity of an aircraft carrying out a mission at a predetermined nominal velocity.

OBJECTS OF THE INVENTION

It is therefore a broad object of my invention to provide simple and reliable means for automatically closely regulating the velocity of an aircraft.

It is another object of my invention to provide such means which exhibit low inertia and are capable of responding sufficiently quickly as to minimize the effects of randomly and rapidly occurring perturbations to the aircraft velocity.

In another aspect, it is an object of my invention to provide such means which respond to sensed acceleration and deceleration of the aircraft velocity to, respectively, slightly increase and decrease the total aircraft drag.

It is another object of my invention to provide such means which serve to regulate aircraft by modulating total aircraft drag rather than by modulating engine speed.

SUMMARY OF THE INVENTION

Briefly, these and other objects of the invention are achieved by extending or deploying variable low inertia, fast responding drag means from the aircraft and rapidly modulating the drag contributed thereby in response to aircraft acceleration and deceleration as sensed by an onboard source of acceleration information. From an intermediate position, the drag is increased if acceleration is sensed and decreased if deceleration is sensed. Various configurations are presently contemplated for the drag means which, however, can take on diverse configurations which may be especially appropriate for a given aircraft, range of expected speed of operation, etc. Among the presently preferred embodiments are: (a) flaps extendable into the airstream about the aircraft from the fuselage or the wings, (b) a rope, cable or the like trailed behind the aircraft and adapted for rapid payout or reel in by a linear motor or a rotary motor driven reel, and (c) an elongated, inflatable "sausage" trailed behind the aircraft and adapted for rapid inflation and deflation to correspondingly rapidly alter its circumferential dimension and hence adjust the drag component contributed thereby.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the accompanying drawing of which:

DETAILED DESCRIPTION OF THE INVENTION

Figure 1:
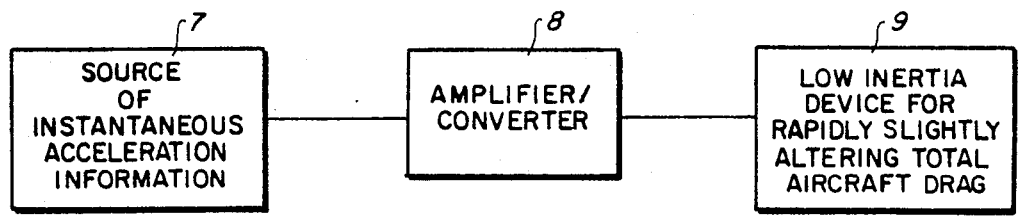
FIG. 1 is a simplified block diagram illustrating the fundamental principal of the invention.

As shown in FIG. 1 (a simplified block diagram), in accordance with the present invention, the output signal from a source 7 of instantaneous acceleration/deceleration information (i.e., the algebraic value of the aircraft longitudinal acceleration) is amplified, and if necessary converted to another form of energy, by amplifier/converter 8 to obtain a correction signal applied to a low inertia device 9 which is adapted to rapidly slightly alter the total aircraft drag and thereby compensate for instantaneously sensed acceleration or deceleration. Conversion performed by the amplifier/converter 8, if any, could be, by way of example only, a conversion from an electrical signal to a hydraulic signal. As will be apparent from the discussion which follows, if the entire sensing and amplification system is electrical, no conversion from one fundamental type of system to another is necessary. Those skilled in the art will understand that the source 7 of instantaneous acceleration information may range, according to the complexity of the aircraft control system, from a simple accelerometer to a subsystem responding to the input from a plurality of sensors and employing extensive computations to develop multiaxis instantatneous acceleration information. For simplicity in explaining the invention, it is discussed in the context of a relatively simple system in which longitudinal acceleration (usually the most important component) is sensed by an accelerometer and longitudinal ground velocity is the compensated factor.

Figure 2:
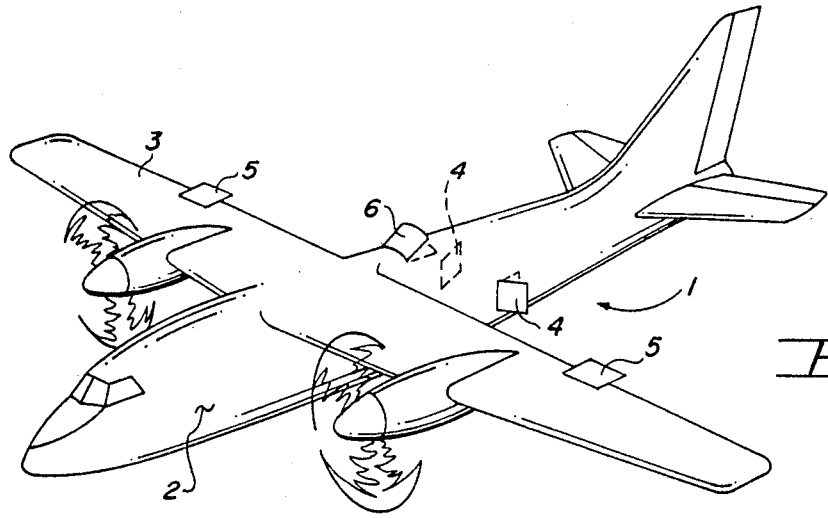
FIG. 2 is a pictorial of an aircraft fitted with a deployable flap embodiment of the invention.

Thus, referring now to FIG. 2, an aircraft 1 having fuselage 2 and wings 3 is illustrated which carries a first, extendable flap embodiment of the invention with the flaps illustrated in several alternative positions which may be used separately or together in accordance with the amount of incremental air drag decrease and increase which may be required in a given application. A first illustrative pair of flaps 4 (of which only the left flap is in view in FIG. 2) is situated intermediate along the length of the fuselage 2, and the flaps 4 are adapted to pivot inwardly or outwardly to control the increase in air drag, if any, contributed thereby. Similarly, a second pair of flaps 5 is shown deployed from the trailing edges of the wings 3, and the flaps 5 may be pivoted upwardly or downwardly to decrease or increase the air drag, if any, contributed thereby. Those skilled in the art will appreciate that, in order not to disturb the aircraft stability, flaps which are situated outboard the longitudinal axis of the aircraft 1 should be provided in symmetrical pairs as shown. Single flaps, as by way of example the flap 6 on top the fuselage 2, can be used if they are situated in the vertical plane passing through the longitudinal axis of the aircraft; however, care must be taken to position single flaps in such a manner as to to preserve the flight characteristics and stability of the aircraft.

Figure 3:
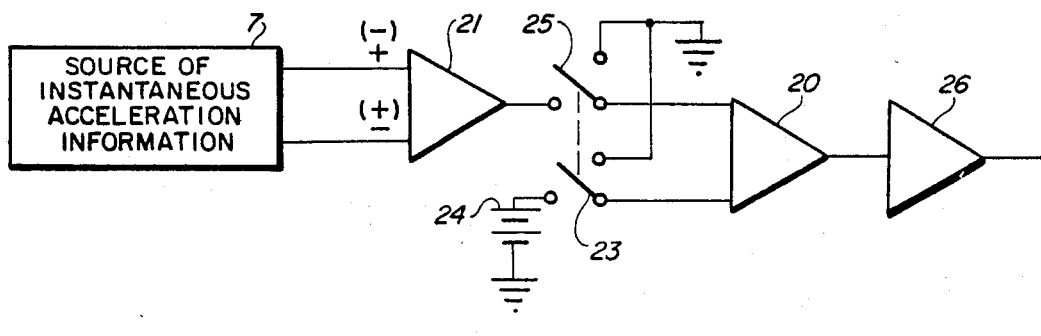
FIG. 3 is a simplified schematic representation of the control system of the embodiment illustrated in FIG. 2.
Figure 3:
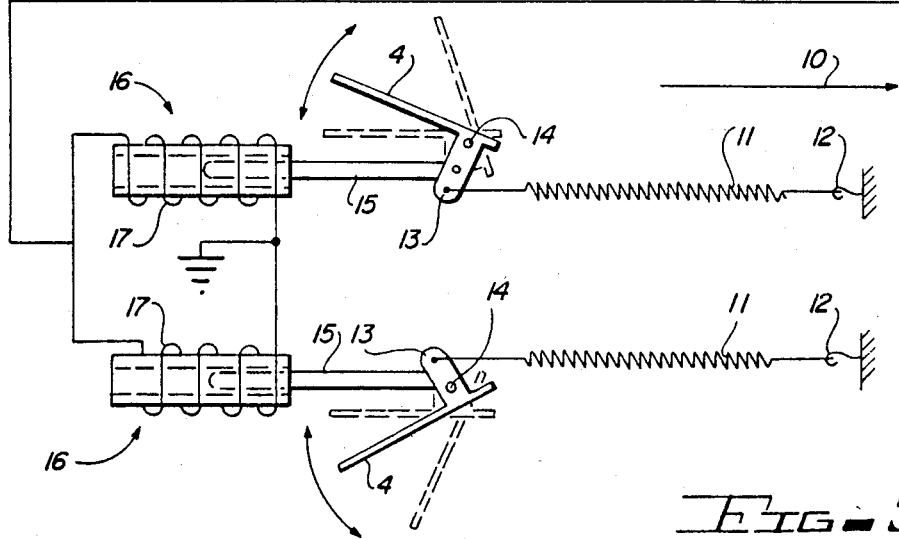

FIG. 3 illustrates, in simplified schematic form, a control system for deploying and regulating the position of the flaps 4 on an aircraft which is flying in the direction indicated by the arrow 10. During normal flight operations, as when flying from a base of operations to a region to be surveyed, the flaps 4 are held in a streamlined position flush against the sides of the fuselage 1 (FIG. 2) by the action of extension springs 11 which are anchored at one end 12 and have their movable ends affixed to bell cranks 13 integral to the flaps 4 and inboard of pivot points 14. Slugs 15 of solenoids 16 are connected to the bell cranks 13 in opposition to the extension springs 11. One end of each solenoid winding 17 is connected to a reference potential of the aircraft's electrical system. The other end of solenoid winding 17 is connected to the output of a power amplifier 26 which is driven by a differential amplifier 20. One input of differential amplifier 20 is driven, through switch 25, by the output signal from a low level amplifier 21. Low level amplifier 21, in turn, receives the output signal from a source 7 of instantaneous acceleration information (hereinafter, for simplicity, source 7 is termed "accelerometer 7"). Accelerometer 7 is adapted to sense instantaneous aircraft longitudinal acceleration and deceleration and issue a corresponding output signal. The second input to differential amplifier 20 is connected, through switch 23, to one terminal of a d-c voltage source which has its other terminal connected to the system voltage reference. Switches 23 and 25 (which may be ganged in a practical installation) apply system reference potential to both inputs of differential amplifier 20 when they are in the "off" position.

During flight operations other than when the system of the present invention is activated, the switches 23,25 are placed in the "off" position such that the output from amplifier 20 is at the system reference potential; i.e., "zero". As a result, no current is applied to the solenoid coils 17 by power amplifier 26, and the flaps 4 are held in the fully retracted, streamlined position by the force of the extension springs 11 applied to the tabs 13.

When it is desired to bring the flaps 4 into operation as during a pass in a survey, the switches 23,25 are thrown to their alternate positions to apply input signals to amplifier 20. Assuming that the aircraft airspeed is instantaneously constant, i.e., a "zero" signal from the amplifier 21, the constant d-c bias signal applied to the amplifier 20 from the reference source 24 results in a current output from the power amplifier 26 which energizes the solenoids 16 to bring the flaps to an intermediate extended position from which they may be extended further or less as aircraft acceleration or deceleration is sensed. When the accelerometer 7 senses instantaneous aircraft acceleration, the output from the amplifier 21 goes positive in an amount determined by the amplitude of the acceleration. As a result, the current output from power amplifier 26 increases to correspondingly increase the pull of the solenoids 16 against the springs 11, and the flaps 4 are thus extended further to increase the total aircraft drag and slightly slow the aircraft. Conversely, when the accelerometer 7 senses instantaneous aircraft deceleration, the output from the amplifier 21 goes negative in an amount determined by the amplitude of the deceleration. As a result, the current output from power amplifier 26 decreases to correspondingly decrease the pull of the solenoids against the springs 11, and the flaps 4 are thus extended less to decrease the total aircraft drag and allow the aircraft to speed up slightly.

It will be apparent that the same control system can be employed to control the extension and actuation of the flaps 5 and/or the single flap 6 of FIG. 2. It is important to understand that the control system of FIG. 3 has been simplified and that it can take on many diverse forms. The fundamental function to be carried out by the control system is to bring about rapid adjustment of the position of the flaps 4, 5, 6 in the corrective direction in response to acceleration or deceleration sensed by the accelerometer 7. Thus, in a given aircraft, it might be preferable to use hydraulic, pneumatic, or other means to actually drive the flaps 4,5,6 to the desired position responsive to the instantaneous condition sensed by the accelerometer 7.

Figure 4:
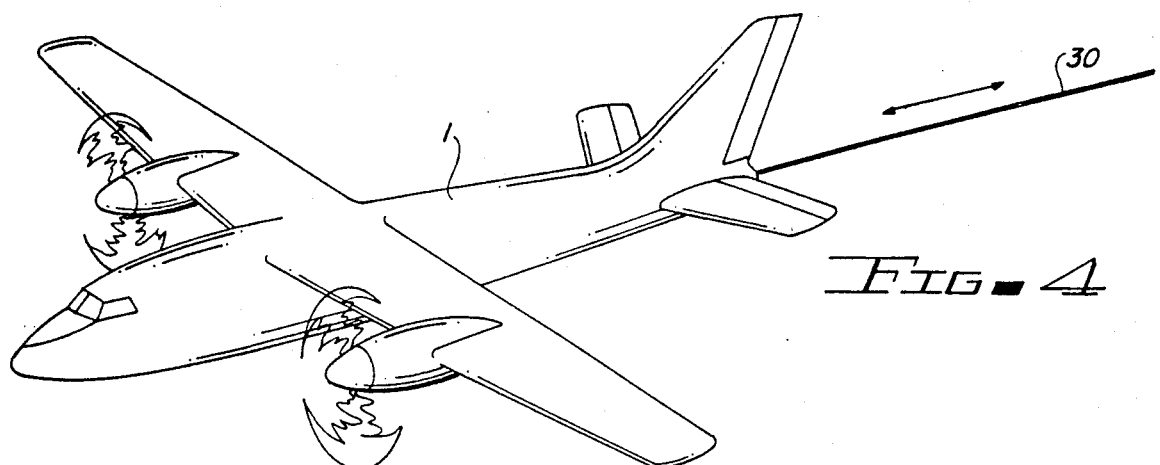
FIG. 4 is a pictorial of an aircraft fitted with a deployable trailing cable embodiment of the invention.
Figure 5:
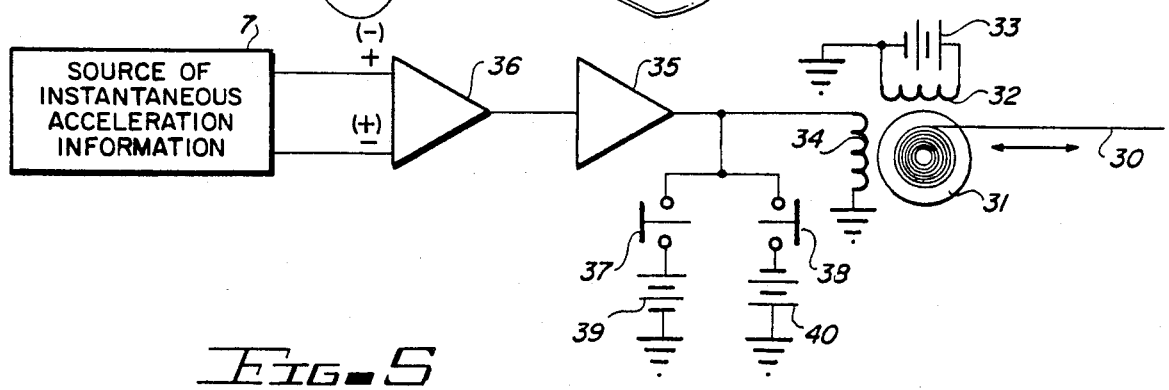
FIG. 5 is a simplified schematic representation of a control system, employing a reversible rotary motor driven reel, of the embodiment illustrated in FIG. 4.
Figure 6:
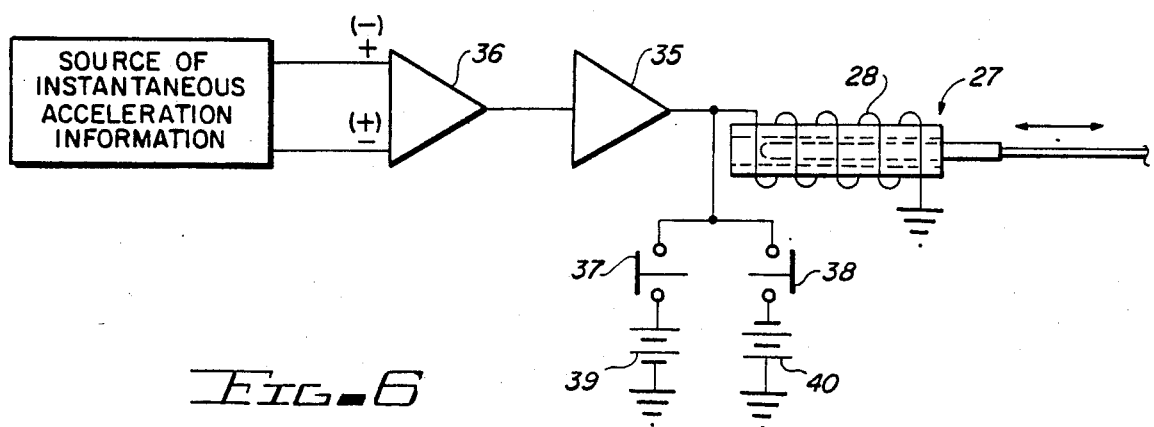
FIG. 6 is a simplified schematic representation of a variant control system, employing a reversible linear motor, of the embodiment illustrated in FIG. 4.

Consider now the embodiment of the invention (which is presently believed to be the preferred embodiment for compensating sensed purely longitudinal acceleration/deceleration) illustrated in FIG. 4, in conjunction with the variant control systems shown in FIGS. 5 and 6 which may be integrated into this embodiment. Inasmuch as the incremental amount of drag contributed by the present invention can be relatively small, very fine and fast control can be effected by the very low inertia FIG. 4 embodiment in which a line 30 (which may be a rope, cable, or the like) is deployed rearwardly from the aircraft 1, and the instantaneous deployed length, responsive to sensed longitudinal aircraft acceleration/deceleration, serves to regulate the total aircraft drag, and hence the aircraft longitudinal velocity.

The control system illustrated in simplified form in FIG. 5 uses a reversible d-c motor driven reel assembly to rapidly pay out and reel in the line 30 in response to longituidnal velocity changes sensed by the accelerometer 7. A shunt field winding 32 is energized by a source 33 of d-c current, typically at a standard voltage according to the motor rating. The direction and speed at which the motor/reel assembly 31 will operate is therefore determined by the polarity and amplitude of the voltage impressed onto the armature winding 34 from a power amplifier 35, the other end of armature winding 34 being connected to a system reference potential. The output of power amplifier 35 is governed, in turn, by the polarity and amplitude of the signal received from low level amplifier 36 which reflects the instantaneous longitudinal acceleration/deceleration condition sensed by the accelerometer 7. If aircraft acceleration is sensed, the resulting signals in the control system are such that power amplifier 35 acts as a current source, and the motor/reel assembly rotates to rapidly pay out the line 30 to incrementally increase the system drag and slightly slow the aircraft. Conversely, if aircraft deceleration is sensed, power amplifier 35 acts as a current sink, and the motor/reel assembly rotates to rapidly reel in the line 30 to incrementally decrease the system drag and allow the aircraft velocity to slightly increase.

The variant control system of FIG. 6 employs a linear motor 27 in place of the motor/reel assembly to effect the position adjustment of the line 30. Hence, the power amplifier 35 drives the winding 28 of the linear motor 27 with current of amplitude and direction governed by the instantaneous condition sensed by the accelerometer 7 and directed to bringing about the desired compensatory action.

Payout of the line 30 to an initial midrange operating position and complete reel in after the completion of a mission requiring the use of the invention may readily be performed by actuating the normally-open pushbutton switches 37,38. For initial payout, actuation of the pushbutton switch 37 applies a positive voltage from a source 39 to the armature winding 34. Similarly, actuation of the pushbutton switch 38 applies a negative voltage from a source 40 to the armature winding 34.

As with the previous embodiment of the invention, it will be understood that the control subsystems illustrated in FIGS. 5 and 6 are merely exemplary. The essence of the FIG. 4 embodiment of the invention is the rapid payout and reel in of the line 30 responsive to aircraft longitudinal acceleration and deceleration sensed by the accelerometer 7.

Figure 7:
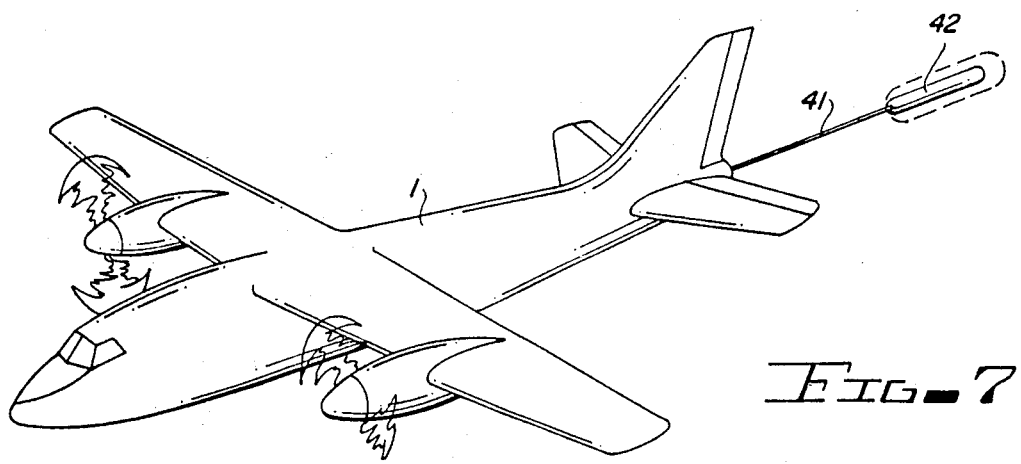
FIG. 7 is a pictorial of an aircraft fitted with a trailing inflatable "sausage" embodiment of the invention.

Attention is now directed to FIG. 7 which illustrates another embodiment of the invention (also especially useful for compensating purely longitudinal sensed acceleration/deceleration) in which an elongated, inflatable "sausage" member 42 is deployed rearwardly from (or towed by) the aircraft 1 by a hose 41. (In practice, it may be necessary to reinforce the hose 41 to sustain the tension to which it is subjected; alternatively, a cable, not shown, of sufficient tensile strength may be used to relieve the hose from the tensile load.) By rapidly increasing or decreasing the pressure within the member 40 to correspondingly increase and decrease its girth and thus the incremental drag it contributes to the total system drag, the velocity of the aircraft can be closely and rapidly regulated in response to changes sensed by the accelerometer 7.

Figure 8:
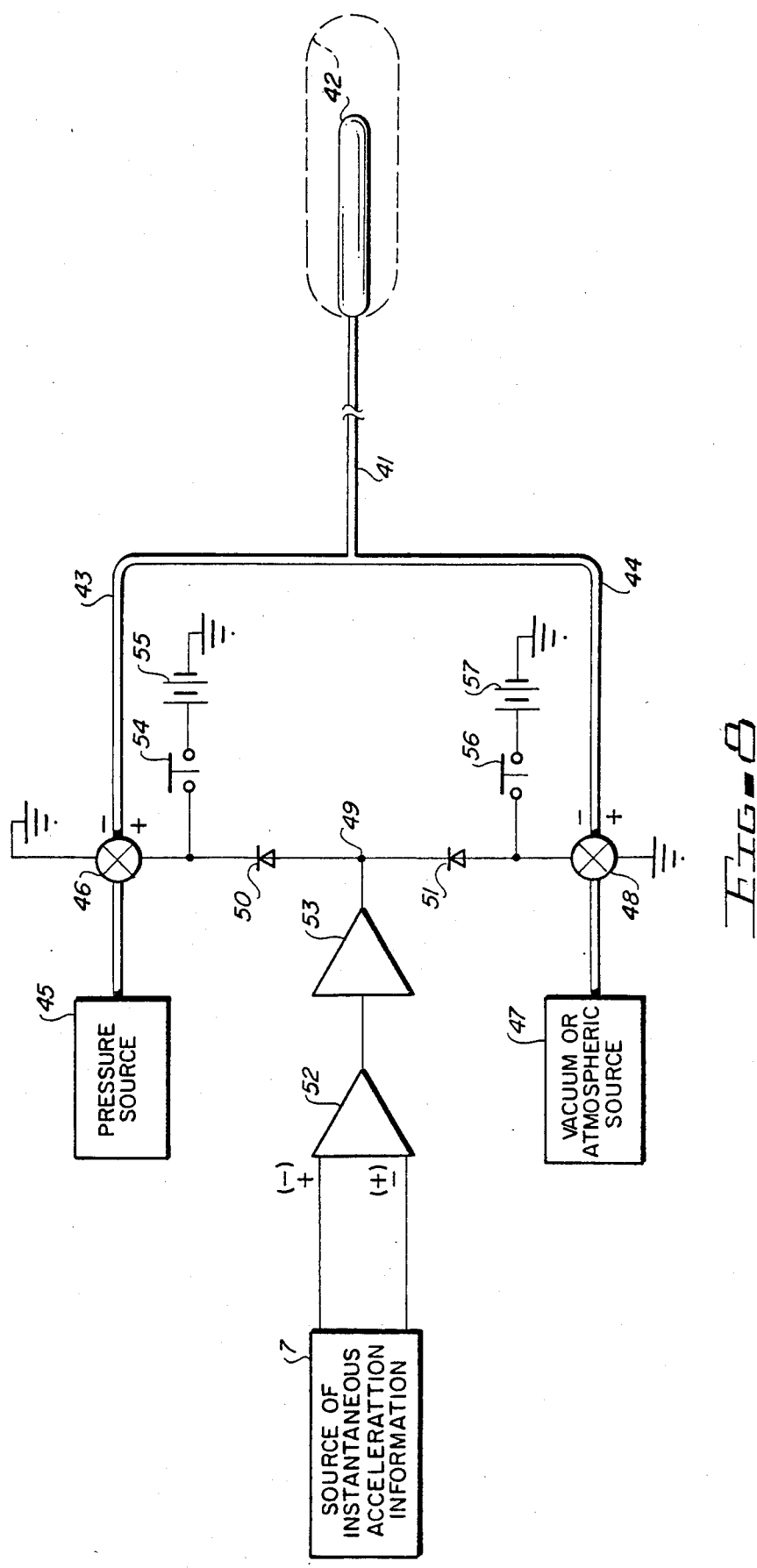
FIG. 8 is a simplified schematic representation of a control system of the embodiment illustrated in FIG. 7.

Referring to FIG. 8, it will be seen that the hose 41 is in communication with conduits 43 and 44. Conduit 43 is selectively placed into communication with a source 45 of pressurized fluid according to the position of a normally-closed, electrically operated valve 46. Similarly, conduit 44 is selectively placed into communication with a source 47 which may be a partial vacuum or ambient atmospheric according to the position of another normally-closed electrically operated valve 48. The electrically operated valves 46,48 are driven from a common tie point 49 through diodes 50,51, respectively. The diodes are connected in circuit such that a positive potential appearing at point 49 will energize only valve 46, and a negative potential appearing at point 49 will energize only valve 48. As in the previously discussed embodiments, the output from the accelerometer 7 drives a low level amplifier 52 which, in turn, drives a power amplifier 53.

In operation, if the accelerometer 7 senses aircraft acceleration, the polarity of the signal applied to the power amplifier 53 will be positive which will result in a positive potential appearing at point 49. Thus, valve 46 will be energized to admit pressurized fluid from the source 45 into the conduit 43, hose 41, and inflatable member 42 which will expand in girth to increase total drag and slightly slow the aircraft. Conversely, if the accelerometer 7 senses aircraft deceleration, the polarity of the signal applied to the power amplifier 53 will be positive which will result in a negative potential appearing at point 49. Thus, valve 48 will be energized to admit the lower pressure fluid from the source 47 into the conduit 44, hose 41, and inflatable member 42 which will decrease in girth to decrease total drag and allow the aircraft velocity to slightly increase.

An initial midrange inflation condition of the inflatable member 42 during use and a fully deflated condition between periods of use can readily be effected by actuation of the normally-open pushbutton switches 54,56. Actuation of the switch 54 applies potential from a positive source 55 to the valve 46 to admit pressurized fluid from the source 45 into the member 42. Similarly, actuation of the switch 56 applied potential from a negative source 57 to the valve 48 to place the member 42 into communication with the source 47 of lower pressure fluid to thereby deflate the member 42. In a simple version of the instant embodiment, the source 47 of lower pressure may be the ambient air.

Again, it will be appreciated by those skilled in the art that the control system of FIG. 8 is simplified and is susceptible of many variations. The fundamental aspects of the embodiment illustrated in FIG. 7 are to bring about: (a) an increase in the pressure within the inflatable member 42 in response to aircraft acceleration sensed by the accelerometer 22 and (b) a decrease in the pressure within the inflatable member 42 in response to aircraft deceleration sensed by the accelerometer 22. It should be noted, in conjunction with the realization of the requisite low inertia characteristic of the invention, that the amount of pressure change and the resultant girth changes to the inflatable member 42 in response to sensed acceleration/deceleration is relatively small and can be achieved at the necessary rate to obtain the desired compensation.

Care must be exercised by the pilot/operator to ensure that any of the embodiments discussed above or contemplated are retracted into safe positions for take-off and landing. Conventional warning lights and or automatic safety systems con be incorporated into the control system to achieve this end.

While the principals of the invention have now been made clear in illustrative embodiments, there will be immediately obvious to those skilled in the art many modifications of structure, arrangements, proportions, elements, materials, and components, used in the practice of the invention which are particularly adapted for specific environments and operating requirements without departing from these principals.

I claim:

1. A method for effecting fine control of the longitudinal velocity of an aircraft comprising the steps of:
   (A) deploying variable air drag means comprising an elongated inflatable bladder from the aircraft;
   (B) sensing the algebraic value of the aircraft longitudinal acceleration;
   (C) when the longitudinal acceleration is sensed to be positive, increasing the air drag imparted by the elongated inflatable bladder by increasing the air pressure therein to increase the girth thereof and thereby decrease the aircraft velocity; and
   (D) when the longitudinal acceleration is sensed to be negative, decreasing the air drag imparted by the elongated inflatable bladder by decreasing the air pressure therein to decrease the girth thereof and thereby increase the aircraft velocity.

2. The method of claim 1 in which step (A) is carried out by deploying a trailing elongated inflatable bladder which is coupled to a first source of air at a first pressure and a second source of air at a second, lower pressure through, respectively, first and second normally-closed valve means, and steps (C) and (D) are carried out, respectively, by actuating the first and second valve means to their open positions.

3. The method of claim 1 in which step (A) is carried out by deploying a trailing elongated inflatable bladder which is coupled to a first source of air at a first pressure and a second source of air at a second, lower pressure through, respectively, first and second electrically-actuated, normally-closed valve means, and steps (C) and (D) are carried out, respectively, by energizing the first and second electrically-actuated valve means.

4. The method of claim 2 in which the second, lower pressure is the ambient pressure.

5. The method of claim 3 in which the second, lower pressure is the ambient pressure.

6. Apparatus for effecting fine control of the longitudinal velocity of an aircraft comprising:
   (A) an elongated inflatable bladder;
   (B) a first source of gas at a first pressure;
   (C) a second source of gas at a second pressure, said second pressure being lower than said first pressure;
   (D) a first normally-closed valve connected to said first source of gas;
   (E) a second normally-closed valve connected to said second source of gas;
   (F) a hose coupling said elongated inflatable bladder to said first and second valves such that actuation of said first valve places gas at said first pressure into communication with said elongated inflatable bladder and actuation of said second valve places gas at said second pressure into communication with said elongated inflatable bladder;

(G) means for sensing the algebraic value of the aircraft longitudinal acceleration;

(H) means responsive to sensed positive longitudinal acceleration of the aircraft to actuate said first valve; and (I) means responsive to sensed negative longitudinal acceleration of the aircraft to actuate said second valve;

whereby, when said elongated inflatable bladder is deployed from the aircraft as a trailing variable air drag means, the girth of said elongated inflatable bladder is increased in response to sensed positive longitudinal acceleration of the aircraft to thereby increase the air drag and consequently decrease the aircraft velocity; and the girth of said elongated inflatable bladder is decreased in response to sensed negative longitudinal acceleration of the aircraft to thereby decrease the air drag and consequently increase the aircraft velocity.

7. The apparatus of claim 6 in which said first and second valves are each electrically-actuated.

8. The apparatus of claim 6 in which said second, lower pressure is the ambient pressure.

9. The apparatus of claim 7 in which said second, lower pressure is the ambient pressure.

* * * * *